United States Patent Office 2,825,203
Patented Mar. 4, 1958

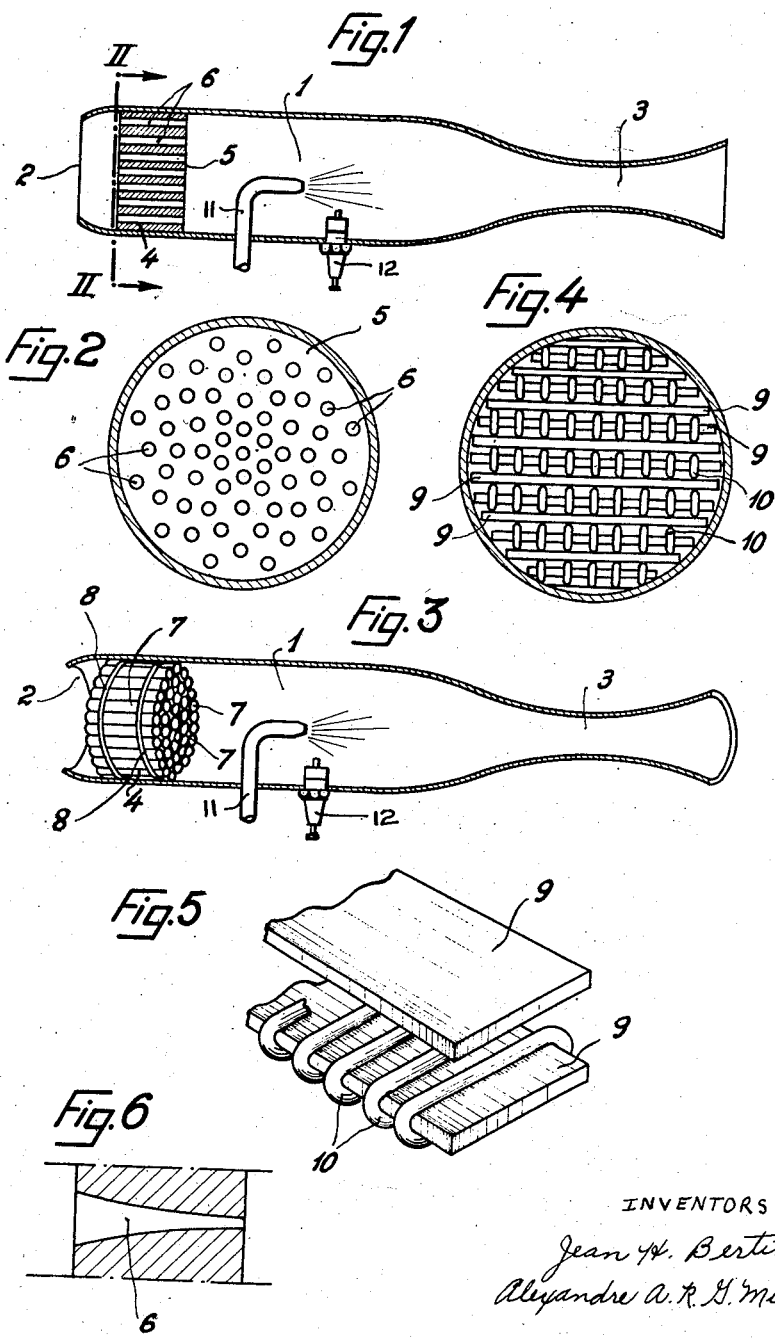

2,825,203

AERODYNAMIC VALVES

Jean H. Bertin, Neuilly-sur-Seine, and Alexandre A. R. G. Mihaïl, Asnieres, France, assignors to Societe Nationale d'Etude et de Construction de Moteurs d'Aviation, Paris, France, a French company Application June 24, 1952, Serial No. 295,373

Claims priority, application France August 3, 1951

2 Claims. (Cl. 60—35.6)

The applicants have already invented and experimented with various aerodynamic valve devices, that is to say, ducts arranged in such manner that their resistance to the flow of a gas in one direction is much smaller than the resistance to the flow thereof in the opposite direction, the said ducts thus being capable of acting as non-return valves while being freely open and comprising no movable member, whereby the disadvantages inherent in such members are avoided.

Such aerodynamic valves are suitable more especially for controlling the admission of fresh air into resonating or non-resonating pulsatory combustion chambers, whether it be a question of the chambers of units called pulse-jet units, in which case the valve has the object of permitting the admission of atmospheric air between the successive combustions, but of preventing the escape of the gases of combustion in the opposite direction, or of chambers intended to feed turbines, in which case the valve will generally be situated between the delivery side of an air compressor and each combustion chamber, its function being to permit the passage of the air from the compressor towards the corresponding chamber, but to prevent delivery of the gases from the chamber towards the compressor.

The aerodynamic valve forming the subject of the present invention arises out of observation of the fact that the coefficient of viscosity of the high-temperature gases resulting from a combustion is much higher than that of the fresh air, i. e. atmospheric air or air delivered by the compressor.

For example, in the case of a pulse-jet unit, the difference between the temperature of the hot gases which the aerodynamic valve is to stop and that of fresh air is about 2000° C. In this case, the ratio of the coefficients of absolute viscosity of the hot gases and of fresh air is about 3.8.

According to the invention, the aerodynamic valve comprises an assembly of small elemental ducts disposed in parallel, the total cross-sectional area of which ensures the required rate of flow of gas in the direction of free flow, each of these ducts having, however, a sectional area sufficiently small to make the pressure loss considerably greater in the case of high-temperature gas than in the case of relatively fresh gas.

The description which follows with reference to the accompanying drawings, which are given by way of non-limitative example, will enable the manner in which the invention can be carried into effect to be readily understood, the details appearing both from the drawings and from the text naturally forming part of the said invention.

Figure 1 shows in axial section a first constructional form of an aerodynamic valve according to the invention as applied to a pulse-jet unit.

Figure 2 is a transverse section of this valve on the line II—II, on a large scale.

Figure 3 shows a constructional modification of the aerodynamic valve.

Figure 4 shows a second modification thereof.

Figure 5 shows on a larger scale a detail of this modification, and

Figure 6 is an axial section on a larger scale through a possible form for an elemental duct.

In the constructional form illustrated in Figure 1, there is shown at 1 the combustion chamber of a pulse-jet unit, at 2 the orifice for the admission of atmospheric air, generally facing towards the front of the propelled craft, and at 3 the nozzle in which the combustion gases are expanded to supply a rearwardly directed propulsive jet.

The arrangement comprises a fuel injector 11 and an ignition device consisting, for example, of a spark plug 12, which may serve only for starting in the case of a resonating arrangement in which the frequency of the successive combustions automatically adjusts itself to the frequency of the sound tube formed by the enclosed space of the arrangement, the ignition at each combustion then taking place by the contact of the fresh carburetted mixture with the residues of the preceding combustion.

There is disposed at 4 the aerodynamic valve, which must offer low resistance to the passage of air from 2 towards 1, but high resistance to the delivery of combustion gases from 1 towards 2.

In the example of Figure 1, the said valve consists of a relatively thick plate 5 having formed therein a number of passages 6 of such small diameter that, by reason of the difference between the viscosity of the fresh air and that of the high-temperature gases resulting from the combustion, the pressure loss on the hot gases is much greater than the pressure loss on the fresh air, the flow of the gases from the chamber 1 towards the orifice 2 thus being substantially prevented.

Assuming that the temperature of the hot gases is 2280° K. and the rate of flow of the hot high-pressure gases through the passages 6 is equal to the speed of sound at this temperature, i. e. 750 m./s., calculation shows that good results will be obtained by giving the diameter of each passage 6 a value smaller than $$\frac{0.115}{P}$$

P being the maximum static pressure in the chamber 1 during the combustion. This corresponds to a Reynolds number lower than 2000 for the hot gases.

The number of passages 6 provided will naturally be such as to allow of obtaining the required rate of air feed.

Many other constructional forms may be conceived within the scope of the invention, which covers all clusters of elemental passages each having a small cross-sectional area of throughflow so as to utilise the fact that the frictional forces for hot gases are greater than that for gases at lower temperature.

Thus, in the constructional modification shown in Figure 3, the aerodynamic valve consists of a cluster of juxtaposed cylindrical tubes 7 of small diameter. These tubes may be connected together by a wire binding 8 and the whole assembly (which is shown in perspective in Figure 3) may be mounted between the air-admission orifice 2, and the chamber 1. It is not necessary, and is even undesirable, to close the gaps between the cylindrical tubes because these gaps also constitute elemental passages of small section.

Figure 4 shows another modification in transverse section (similar to that of Figure 2). The elemental passages are here formed between parallel plates 9 stacked parallel to the axis of the chamber 1. These plates are maintained at a small distance apart by covering each second plate with a winding 10 of wire of small diameter, the pitch of the winding being such as to obtain the required small section for each elemental passage defined by two adjacent plates 9 and by two contiguous convolutions of the winding 10.

Many other constructions are naturally possible.

Hitherto, the section of a passage has been assumed to be constant from end to end, but since the pressure of the hot gases which tend to escape through the elemental passages decreases from the chamber, as also does the Reynolds number, there is nothing to prevent the section of each elemental passage from increasing in proportion as it extends away from the chamber.

Figure 6 thus shows the section of an elemental passage of revolution, having a form diverging from the chamber 1 towards the inlet orifice 2 for the atmospheric air. Each passage could also be given a conical form or any other form of increasing section from the chamber towards the outside.

Naturally, the application to pulse-jet units has only been indicated by way of example and is in no way limitative.

The invention is applicable in all cases where it is desired to permit the flow of gas at relatively low temperature in one direction, but to prevent the flow of gas at much higher temperature in the opposite direction.

It has already been proposed to apply pulsatory combustion chambers to the feeding of gas turbines.

What we claim is:

1. In a pulse jet unit having a resonant firing combustion chamber, a valveless unilaterally conductive air inlet device for said chamber of the type offering a greater resistance to the backflow of hot gases from said combustion chamber than to the flow of fresh air thereinto, said device comprising a plurality of piled up plates, spaced from and substantially parallel to each other, and a wire wound round every other plate with spaced turns, said wires contacting and separating relatively adjacent plates, whereby passages are bounded between adjacent plates and successive turns of wire.

2. A device as claimed in claim 1, wherein the winding is of substantially uniform pitch, with substantially parallel portions on each side of the plate.

References Cited in the file of this patent

UNITED STATES PATENTS

| | | |
|---|---|---|
| 403,294 | Schmid et al. | May 14, 1889 |
| 1,448,151 | Reeves | Mar. 13, 1923 |
| 1,503,371 | Meyer | July 29, 1924 |
| 1,515,408 | Puffer | Nov. 11, 1924 |
| 1,852,164 | Holzwarth | Apr. 5, 1932 |
| 2,347,903 | Gluck et al. | May 2, 1944 |
| 2,523,308 | Kemmer et al. | Sept. 26, 1950 |
| 2,551,112 | Goddard | May 1, 1951 |
| 2,618,925 | Wislicenus | Nov. 25, 1952 |
| 2,633,703 | Tenny et al. | Apr. 7, 1953 |
| 2,639,580 | Stuart | May 26, 1953 |
| 2,731,795 | Bodine, Jr. | Jan. 24, 1956 |

FOREIGN PATENTS

| | | |
|---|---|---|
| 22,103 | Norway | Apr. 1, 1912 |
| 71,759 | Sweden | Apr. 30, 1928 |